United States Patent
Fremstad

[11] Patent Number: 5,820,292
[45] Date of Patent: Oct. 13, 1998

[54] WEDGE-LOCK CORNER FOR PICTURE FRAMES

[76] Inventor: Gregory E. Fremstad, 5120 Franklin Blvd. #5, Eugene, Oreg. 97403

[21] Appl. No.: 768,847

[22] Filed: Dec. 18, 1996

Related U.S. Application Data

[63] Continuation of Ser. No. 459,344, Jun. 2, 1995, abandoned.

[51] Int. Cl.[6] .................................................. B25G 3/36
[52] U.S. Cl. ........................ 403/403; 403/205; 403/315; 403/321; 40/152
[58] Field of Search ..................................... 403/403, 205, 403/315, 321, 320, 334, 358, 373, 374, 401, 402; 40/152, 152.1, 155, 156, 157

[56] References Cited

U.S. PATENT DOCUMENTS

| | | |
|---|---|---|
| 2,538,138 | 1/1951 | Webster . |
| 3,782,054 | 1/1974 | Goss, Jr. . |
| 3,784,150 | 1/1974 | Kulicke . |
| 3,965,601 | 6/1976 | Nielsen . |
| 4,122,617 | 10/1978 | Nielsen . |
| 4,236,847 | 12/1980 | Yasuda ................................ 403/205 X |
| 4,385,744 | 5/1983 | Sherman . |
| 4,499,679 | 2/1985 | Sherman . |
| 4,516,341 | 5/1985 | Jenkins ................................ 403/402 X |
| 4,531,315 | 7/1985 | Sobel .................................. 403/401 X |
| 4,538,936 | 9/1985 | Zeidl ...................................... 403/402 |
| 4,559,733 | 12/1985 | Forslund . |
| 4,659,270 | 4/1987 | Herb . |
| 4,709,495 | 12/1987 | Buckwalter . |
| 4,738,039 | 4/1988 | Sun et al. ............................. 403/402 X |
| 4,862,612 | 9/1989 | Sugihara et al. . |
| 4,929,114 | 5/1990 | Young . |
| 5,007,189 | 4/1991 | Buckwalter . |
| 5,010,708 | 4/1991 | Evans et al. . |

*Primary Examiner*—Anthony Knight
*Assistant Examiner*—Bruce A. Lev
*Attorney, Agent, or Firm*—Marger, Johnson, McCollom & Stolowitz P.C.

[57] ABSTRACT

A frame corner joining apparatus for joining two metal picture frame members at a predetermined angle to form a frame corner. The joining apparatus includes first and second legs disposed at the predetermined angle relative to each other, each leg receivable in a corresponding frame member channel. Each leg includes a fillet surface and a sloping surface, having a slot and a wedge piece with tab received in the slot. The wedge piece may be in two positions: an unlocked position in which the wedge piece is at the lowest point on the sloping surface, and a locked or raise position in which the top side of the wedge piece engages a surface of the picture frame. The wedge piece may be adjusted manually with needle nose pliers or automatically with a pneumatic device until the fillet surface of the frame corner joining apparatus tightly abuts the back lip edge of the picture frame member.

13 Claims, 3 Drawing Sheets

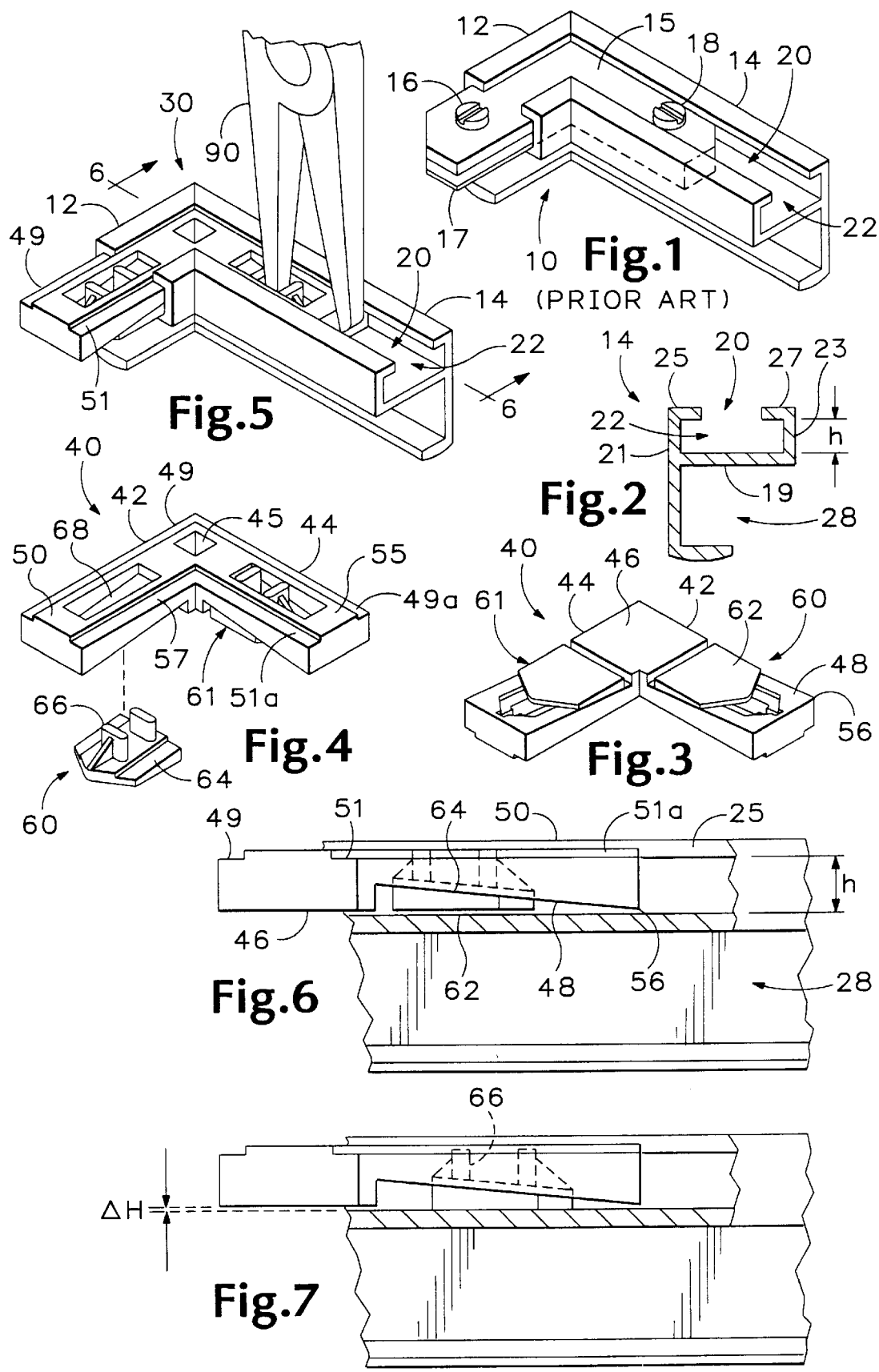

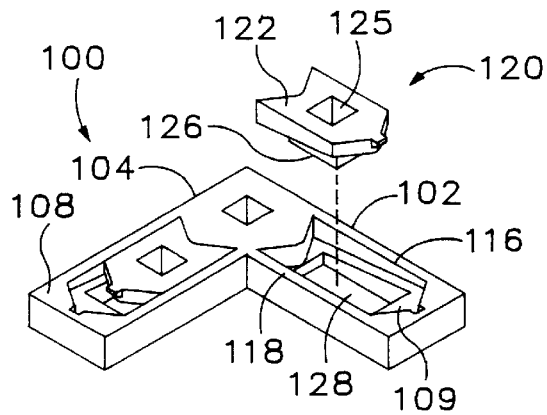
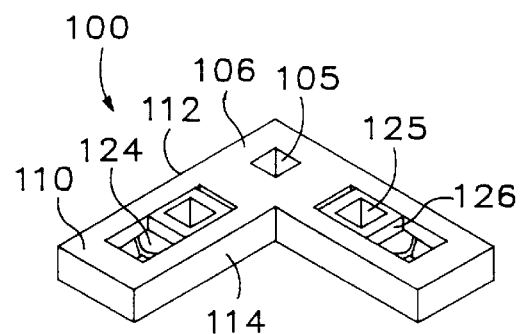
Fig.8
Fig.9
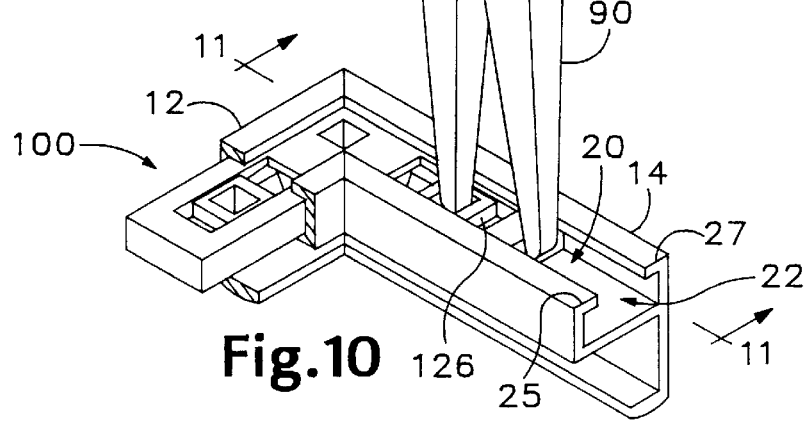
Fig.10
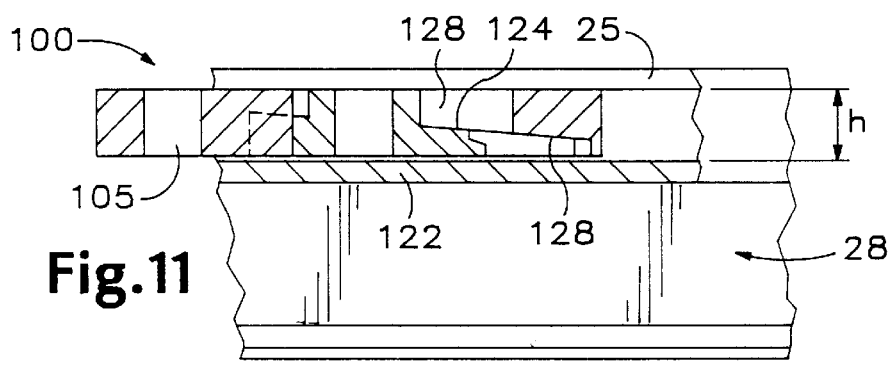
Fig.11
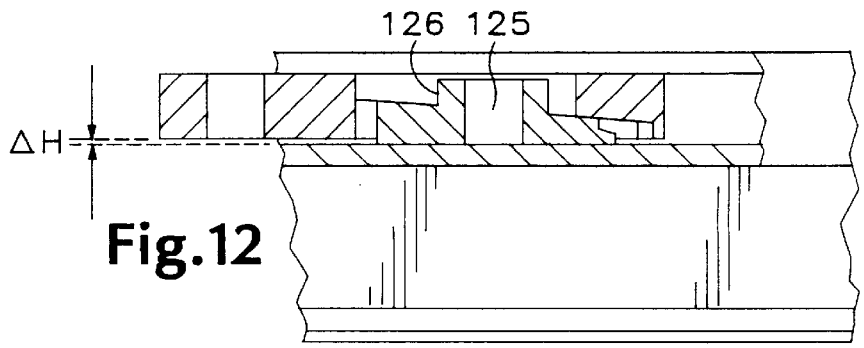
Fig.12

WEDGE-LOCK CORNER FOR PICTURE FRAMES

This is a Continuation of application Ser. No. 08/459,344, filed Jun. 2, 1995, now abandoned.

BACKGROUND OF THE INVENTION

This invention relates generally to picture frames and more particularly to apparatus for joining picture frames at the corners thereof.

Referring to FIG. 1, a perspective view of a frame corner having a prior art two-piece corner hardware installed therein is shown at 10. The frame corner is representative of all four corners of a picture frame. The corner includes two metal frame members 12 and 14, typically aluminum, each having a mitred end to allow the pieces to be brought together in an abutting relationship to form a 90° corner. Each frame member has a partially enclosed, longitudinal C-shaped channel 22 formed therein for receiving the corner hardware, shown in cross-section in FIG. 2. The metal frame members 12, 14 are conventional.

An end elevated view of frame member 14 is shown in FIG. 2. Frame member 14 includes a partially enclosed channel of height h defined by a bottom wall 19, side walls 21, 23, and upper lips 25, 27 which fold inward at right angles from the side walls. Lips 25 and 27 further define a longitudinal opening 20 therebetween which runs the length of frame member 14, as shown in FIG. 1, and which exposes a portion of the installed frame corner hardware. The frame members further include a second longitudinal channel, e.g., channel 28 of member 14, for receiving a picture, backing and a sheet of glass, etc.

Returning to FIG. 1, the corner hardware 10 includes a top plate 15 having two screws 16 and 18 received in tapped bores formed in the plate. Longitudinal opening 20 provides access to the screws when the corner hardware 10 is received in the frame member longitudinal channels 22 as shown in FIG. 1. The corner hardware further includes a thin backing plate 17 opposite the screws. Backing plate 17 distributes the downward force of screws 16, 18 along the frame member when the corner hardware is positioned as shown and screws 16, 18 are tightened. This separates plates 15, 17 in channel 22 and joins members 12, 14 as shown and, due to the rigidity of the inserted frame corner hardware, prevents the frame member from being deformed. The backing plate also prevents the screws from deforming or "dimpling" the frame when the screws are tightened. The corner hardware shown in FIG. 1 is a so-called "Neilsen" style corner hardware. The Neilsen style corner hardware has become a standard in the framing industry because it is effective in substantially eliminating the dimples.

The Neilsen style corner hardware, however, is time consuming to install. The Neilsen style hardware suffers from an additional problem. It is customary to thread screws, like screws 16, 18, into their respective bores in a top plate, like top plate 15, prior to shipping the corner hardware to a customer. Framers and others who use corner hardware 10 have come to expect that they will not have to thread screws into the hardware. During shipping, the screws have a tendency to vibrate in or out of their bores. Often the screws will work their way completely out. If vibrated in or out, additional labor to either back out the screws to get the plates, like plates 15, 17, into channel 22 or to turn the screws numerous times to wedge the plates in channel 22 of the frame members. Also, manual assembly can cause Carpal Tunnel Syndrome and other similar occupational disorders. Finally, screw-based frame and frame corner systems such as the Neilsen style are difficult to assemble using automated techniques.

SUMMARY OF THE INVENTION

The present invention comprises a frame corner joining apparatus for joining two mitred frame members of the type having longitudinal channels of a predetermined height and being disposed at a predetermined angle to form a frame corner. The apparatus has first and second legs which are each receivable in a corresponding frame member channel. Each leg has a bottom surface and a top surface, wherein each surface is in nonparallel relationship to one another thereby forming a sloping surface on the top surface of the apparatus having a high end. Furthermore, each leg has a corresponding wedge piece having a sliding surface and a supporting surface, wherein the sliding surface on the wedge piece is located opposite the supporting surface and in nonparallel relationship thereto. The supporting surface of the wedge piece is in increasing frictional engagement with its corresponding channel as the wedge piece, in sliding engagement with the top surface of its corresponding leg, moves up to the high end of the leg with the leg inserted in the corresponding channel.

Preferably, the sloping surface of the apparatus leg has a slot defined therethrough for receiving corresponding tabs located on the sliding surface of the wedge pieces. Furthermore, the apparatus may have angled fillet surfaces which abut the lips of the frame channel when the apparatus is placed in the locked position, thereby causing the angled fillet on the device to engage the lips for a tight fit along an elongate surface. The raised fillet then presents a flush surface with the lips of the frame channel, thereby allowing hook and loop material to be used between the fillet and the wall for hanging purposes.

Because the present invention only requires a lateral force to institute the locking wedge system, a frame assembly can be partially automated using a simple pneumatically powered device.

Another advantage of the present invention is that the means joining the frame members does not require screws.

Yet another advantage of the present invention is that the joining means provides a flush surface with the back side of the frame channel to accept adhesive die-cut pieces of hook fabric for fastening to loop material mounted on a wall.

The foregoing and other features and advantages of the invention will become more readily apparent from the following detailed description of a preferred embodiment of the invention which proceeds with reference to the accompanying drawings.

BRIEF DESCRIPTION OF THE DRAWINGS

FIG. 1 is a cutaway perspective view of two conventional frame members, one of which is sectional, held together by a prior art corner piece to form a frame corner.

FIG. 2 is an end elevation view of a standard picture frame member.

FIG. 3 is a top perspective view of a frame member joining device constructed in accordance with the present invention.

FIG. 4 is a bottom perspective view of the device of FIG. 3 with a wedge piece exploded away from its insertion point.

FIG. 5 is a perspective view of two frame members, one of which is sectioned, held together by the device of FIG. 3 to form a frame corner, further showing adjustment of the device using pliers.

FIG. 6 is a side view of the frame joining device of FIG. 5 taken along line 6—6 with the wedge piece in the unlocked or lowered position and with a single frame member shown partially cut away and partially in section.

FIG. 7 is a view similar to FIG. 6 with the wedge piece in the locked or raised position.

FIG. 8 is a top perspective view of a preferred embodiment of the present invention with a wedge piece exploded away from its insertion point.

FIG. 9 is a bottom perspective view of the preferred device of FIG. 8.

FIG. 10 is a perspective view of two frame members, one of which is sectioned, held together by the device of FIG. 8 to form a frame corner, further showing adjustment of the device using pliers.

FIG. 11 is a side view of the frame joining device of FIG. 10 taken along line 11—11 with the wedge piece in the unlocked or lowered position and with a single frame member shown partially cut away and partially in section.

FIG. 12 is a view similar to FIG. 11 with the wedge piece in the locked or raised position.

DETAILED DESCRIPTION

Figure 13:
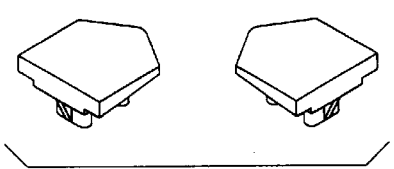
FIG. 13 shows the wedge piece of FIG. 4 in top perspective view.
Figure 14:
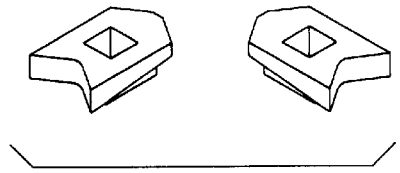
FIG. 14 shows the wedge piece of FIG. 8 in top perspective view.

Referring now to FIG. 5, a perspective view of a picture frame corner is shown generally at 30. The corner 30 is representative of all of the corners of the corresponding frame. Only the single frame corner 30 is shown for illustrative purposes. The frame corner includes two frame members 12 and 14 each having a mitred end to allow the member 12 and 14 to be placed in an abutting relation, as shown in FIG. 5. The frame members are, in the preferred embodiment, made of aluminum. Each is substantially identical to frame member 14 in FIG. 2 and has structure numbered accordingly.

Referring now to FIGS. 3 and 4, a frame member joining device 40 according to the invention is shown in top perspective and bottom perspective views respectively. The joining device includes legs 42 and 44 which are substantially identical. The two legs are joined together at a predetermined angle corresponding to a desired frame corner angle. The two legs 42 and 44 are disposed at a 90° angle in FIGS. 3 and 4, but the legs can be disposed at any relative angle, e.g., 135° depending on the desired frame configuration, e.g., octagonal. The legs extend from an elevated middle portion 46 having a cavity 45 defined on one side thereof.

With reference also to FIG. 6, leg 42 comprises an elongate member having a first recessed surface 48, a second surface 50 and a slot 68. As shown in FIGS. 6 and 7, recessed surface 48 and second surface 50 of leg 42, in the preferred embodiment of the invention, are characterized by nonparallel planes relative to one another. The top surface slopes generally upward at an approximate angle of 5 degrees, relative to the bottom surface of the leg, to a high point 56. The high point of the sloped top surface of the leg and the elevated middle portion 46 are generally coplanar. As shown in FIGS. 2 and 6, one standard channel inside height "h" is approximately 0.205 inches ±0.010 inches; the preferred embodiment is sized for this height. The height of the leg members can be varied to correspond to the height of the frame channel height. The leg height is made substantially equal to or slightly less than the corresponding frame channel height to allow easy insertion of the legs in the corresponding frame channel. A pair of recessed surfaces 49, 51 and 49a, 51a, are formed along the entire length of each side of device 40 to accommodate lips 25, 27 (in FIG. 2) of frame member 14.

Figure 16:
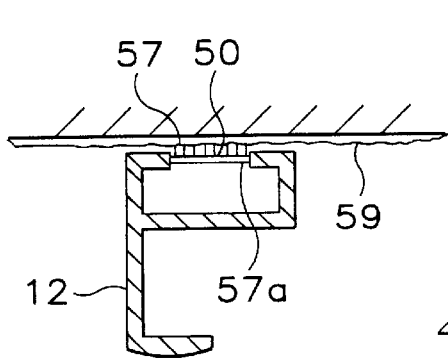
FIG. 16 shows a cross-sectional view of a frame corner sample mounted on a wall with hook and loop fastener material.
Figure 17:
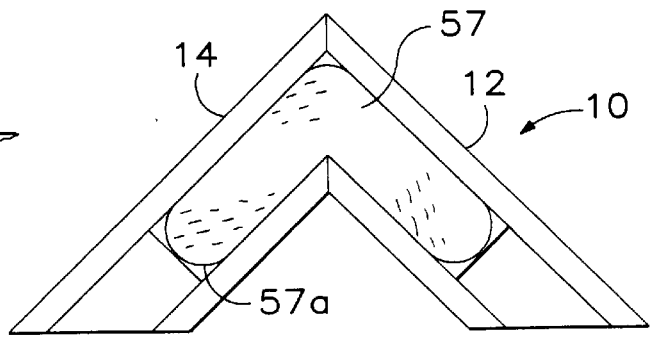
FIG. 17 is a view of the frame corner sample of FIG. 16 showing the fastener material mounted on the rear of the frame corner sample.

In its preferred embodiment, the second leg surface 50 is formed on a raised fillet 55 along a central axis of the leg. The fillet is shown in perspective in FIG. 4, and illustrates the complementary fit of the leg within the frame channel shown in perspective in FIG. 5. Fillet 55 is sized to substantially fill the picture frame channel opening 20 and raise surface 50 of the inserted device to slightly under the lips of the channel as viewed in FIG. 16. In this respect, hook and loop fastener material tab 57 (also viewable in FIG. 17) may be mounted on the raised surface and attached to complementary hook and loop fastener material 59 attached to the wall in the location where the frame corner sample is to be hung. This configuration prevents an adhesive edge 57a of tab 57 from catching when corner 10 is not mounted as shown in FIG. 16. The rounded corners of tab 57, as shown in FIG. 17, help to prevent peeling up of the edges and corners of the tab.

Device 40 further includes a wedge-shaped piece 60 having a top supporting surface 62 and a bottom sliding surface 64 in generally non-parallel planar relation corresponding substantially to the slope of the recessed leg surface 48 relative to the second leg surface 50. Wedge piece 60 further includes tab 66 which project centrally from the bottom sliding surface of the wedge piece. A wedge-shaped piece 61 is substantially identical to wedge-shaped piece 60.

Each of the slots, like slot 68 in FIG. 4, receives a corresponding tab, like tab 66. The slot 68 is sized to fully engage tab 66 within a portion of the slot when the wedge piece 60 is inserted in the device 40. When the tab is inserted in the slot, and the sliding surface 64 of the wedge piece rests on the sloped recessed surface of the leg 48, the wedge piece may be moved along the top surface as the tabs move within and along the length of the elongate slot. To allow accessibility of the tab from the underside of the leg, the slot into which it fits preferably extends through the leg from its top surface to its bottom surface. The wedge may then be moved from a low position, as shown in FIG. 6, to a high position as shown in FIG. 7 and vice versa.

When wedge piece 60 is in the position of FIG. 6, surface 62, elevated middle portion 46, and high point 56 on leg 44 are substantially contained within the same plane. As the wedge piece moves to the position of FIG. 7, the height of device 40 is effectively increased by ΔH as shown in FIG. 7. This results in device 40 being wedged into position as surface 62 is urged against the lower surface of the C-shaped channel and as surfaces 49, 49a, 51, 51a are urged against the underside of lips 25, 27 (in FIG. 2) of the channel.

The rigid frame joining device 40 is essentially one piece and thus resists torsional movement of the legs such as that caused by the weight of a glass held in the frame. The above-described joining device 40 is preferably made of ceramic-and-glass filled plastic and may be manufactured by any methods which are well known in the art. The other necessary steps are known in the art of injection molding given the drawings and description herein.

In use, each leg of the joining device 40 is inserted into the first channel of the respective frame member with wedges 60, 62 in the position shown in FIG. 6. For example, in FIG. 5, leg 44 is received in first channel 22 of corresponding frame member 14 so that the corresponding wedge piece is face down within the channel. Once the legs are received in the respective first channels of the corresponding frame members, the mitred ends of the channel members are placed in an abutting relation, as shown in FIG. 5. Next, standard needle nose pliers 90 may be inserted through the channel opening and the slot to engage tab 66 and the end of the leg. As the pliers are gripped, the tab moves toward the leg end, sliding surface 64 on the wedge along the sloped surface 48 of the leg. Surfaces 49, 51, 49a, 51a are urged against frame channel lips 25, 27. Frame member 14 is thus firmly engaged with the inserted leg 44 of the device, and similar operation will engage frame member 12 with inserted leg 42. Alternate means for engaging the wedge piece may be used, such as the pneumatic device of FIG. 15 which automatically applies force to the tabs 66, thereby moving the corresponding wedge to a locking position.

An alternate embodiment of the invention is shown in FIGS. 8 and 9. Joining device 100 includes legs 102, 104 which are substantially identical. The legs extend from a middle portion 106 having a hole 105 defined therethrough and have a top surface 108 and a bottom surface 110. Additionally, each of the legs, for instance leg 102, have side walls, such as side walls 112 and 114 which extend upward from the bottom surface 110 of the leg to laterally enclose a sloped recessed surface 109 of the leg. Side walls 112, 114 further enclose a slot 128 located on the sloped surface and passing through the leg to the bottom surface 110. The side walls terminate at an edge, 116 and 118, which is coplanar with the middle portion 106 of the leg.

The device also includes a wedge piece 120 having a top surface 122 and bottom surface 124 which are nonparallel. Wedge piece 120 further has a hollow square flange 126 projecting from the bottom surface of the wedge piece through which a hole 125 passes upward through the top surface 122. The nonparallel relation of top surface 122 to bottom surface 124 corresponds substantially to the slope of recessed surface 109 so that top surface 122 extends substantially coplanar with edges 116 and 118 when the wedge piece is placed in the lowest portion of the sloped top surface of the leg as shown in FIGS. 8 and 11. Slot 128, defined within sloped recessed surface 109, is sized to fully receive flange 126. As with the preferred embodiment, device 100 may be operated manually or semiautomatically by the methods described above to join two frame members together.

As in FIG. 5, actuation of device 100 by pliers 90 is shown in FIG. 10. Legs 102, 104 of device 100 are placed inverted within the frame channel 22 of corresponding frame members 12, 14 so that the wedge pieces are face down within the channel. Channel opening 20 exposes the hollow square flange 126 which may be gripped using standard needle-nosed pliers 90. One arm of the pliers are inserted in hole 125 of flange 126 and the other plier arm engages the leg end. As the pliers are gripped, tab 120 moves toward the leg end, sliding bottom surface 124 on the wedge along the sloped recessed surface 109 of the leg. As the wedge piece slides up the sloped surface of the leg thereby raising its top surface 122 above the planar top surface 108 of the leg, bottom leg surface 110 is urged against frame channel lips 25, 27. Frame member 12 is thus firmly engaged with the inserted leg 104 of the device, and similar operation will engage frame member 12 with inserted leg 102. Wedge piece 120 may then be moved from a low, unlocked position, as shown in FIG. 11, to a high, locked position, as shown in FIG. 12.

Figure 15:
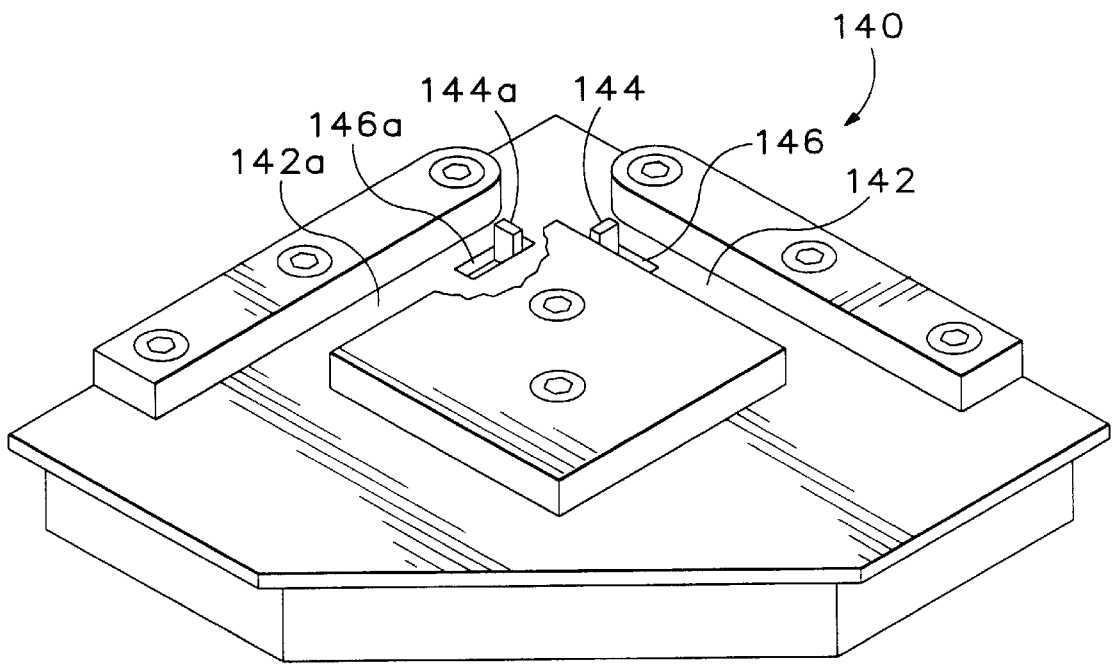
FIG. 15 shows a perspective view of a device used to automatically install a device constructed in accordance with the invention without the use of pliers.

Repetitive use of pliers by framers in constructing a multitude of frames can cause Carpal Tunnel Syndrome or a similar occupational hazard. FIG. 15 shows a semi-automated pneumatic device used to install corner piece devices constructed in accordance with the invention without the use of pliers. The device, shown at 140, includes a shaped channel 142, 142a which corresponds to the frame angle to be constructed, shown in FIG. 15 as 90 degrees. Two projections 144, 144a extend upward from the channel within elongate slots 146, 146a and are operatively connected to a pneumatic foot-operated valve (not shown) which activates a pneumatic cylinder which moves the projections from a first position within the slot to a second position. These tabs can alternately be moved using a variety of fluidic, mechanical, etc., techniques.

A frame corner is assembled as described above and placed face up within the shaped channel of pneumatic device 140 so that tabs 66 or flanges 126 of the wedge piece are engaged by projections 144, 144a. The operator then presses the foot-operated valve, thereby causing the projections to move outward and the engaged wedge piece to move to a raised position which locks the frame members together. The operator may then remove the completed corner piece and assemble another one. Semi-automation of this sort is not easily accomplished with screw based systems and frames corners are not as quickly assembled. As noted above, a variety of techniques may be utilized to effect movement of the pins.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. An apparatus for joining two frame members of the type having longitudinal channels having a predetermined height and being disposed at a predetermined angle to form a frame corner, the apparatus comprising:

first and second legs, each leg being receivable in a corresponding frame member channel;

first and second wedge pieces, each corresponding to said first and second legs, each piece having a sliding surface adapted to contact and linearly slide against a respective leg, and a supporting surface adapted to contact one of the frame members, said sliding surface being located opposite said supporting surface and in oblique relationship thereto;

the first and second legs including:

a bottom surface adapted to contact one of the frame members; and a top surface, said top surface being in nonparallel relationship to said bottom surface thereby forming a high end of said leg, such that the supporting surface of the wedge piece is adapted to be in increasing frictional engagement with the corresponding channel as the wedge piece sliding surface, in sliding engagement with the top surface of the corresponding leg, is moved up to the high end of the leg when the leg is inserted in the corresponding channel, the bottom surface being substantially parallel with the supporting surface of the corresponding wedge piece when the sliding surface of the wedge piece is in sliding engagement with the top surface, wherein the frame channel is of a type having a longitudinal opening defined on a back end of the channel for exposure of substantially all of a leg surface when the leg is inserted in the corresponding channel, wherein the first and second legs each have a slot defined thereon and passing from the top surface of each leg to the corresponding bottom surface for receiving a wedge piece.

2. An apparatus for joining two frame members according to claim 1 wherein the first and second wedge pieces each have tabs located adjacent the sliding surface of said pieces, said tabs being adapted to fit into a portion of the slot defined on the top surface of the leg.

3. An apparatus for joining two frame members according to claim 1 wherein the legs of the apparatus are disposed at a 90 degree angle.

4. An apparatus for joining two frame members of the type having longitudinal channels having a predetermined height and being disposed at a predetermined angle to form a frame corner, the apparatus comprising:

first and second legs, each leg being receivable in a corresponding frame member channel;

first and second wedge pieces, each corresponding to said first and second legs, each piece having a sliding surface adapted to contact and linearly slide against a respective leg and a supporting surface adapted to contact one of the frame members, said sliding surface being located opposite said supporting surface and in oblique relationship thereto;

the first and second legs including:

a bottom surface adapted to contact one of the frame members; and a top surface, said top surface being in nonparallel relationship to said bottom surface thereby forming a high end of said leg, such that the supporting surface of the wedge piece is adapted to be in increasing frictional engagement with the corresponding channel as the wedge piece sliding surface, in sliding engagement with the top surface of the corresponding leg, is moved up to the high end of the leg when the leg is inserted in the corresponding channel, wherein the frame channel is of a type having a longitudinal opening defined on a back end of the channel for exposure of substantially all of a leg surface when the leg is inserted in the corresponding channel, further including:

a raised fillet surface defined on the bottom surface of the first and second legs and sized to substantially fill the longitudinal opening of the frame channel along the inserted length of the leg when the leg is inserted face-down within the channel.

5. An apparatus for joining two frame members according to claim 4 further including attachment means located on the raised fillet surface for mounting the apparatus to a wall.

6. An apparatus for joining two frame members according to claim 5 wherein the attachment means includes a hook or loop material adhered to a portion of the fillet surface for attachment to a complementary material adapted to be located on a wall location.

7. An apparatus for fixing two frame members at a predetermined angle, said frame members being of the type having a generally C-shaped cross sectional channel, said apparatus comprising:

a central body;

a pair of legs extending from said central body, said legs each having a longitudinal axis which are at said predetermined angle relative to one another;

a base surface formed on each of said legs and being parallel to the longitudinal axis associated therewith;

an elongate ramp surface formed on each of said legs and being nonparallel to the longitudinal axis associated therewith; and a pair of wedge pieces each having a sliding surface adapted for sliding linearly along the ramp surface, each of said wedge pieces further having a support surface oblique to said sliding surface which is adapted to contact one of the frame members urged against said frame channel when the leg is received in the channel and the wedge piece is slid along the ramp surface, the base surface being substantially parallel with the support surface of the corresponding wedge piece when the sliding surface of the wedge piece is in sliding engagement with the ramp surface.

8. The apparatus of claim 7 wherein each wedge piece and its associated leg as measured from the base surface of the leg to the support surface of the wedge are adapted to be less than a depth of a conventional C-shaped member when each of said wedge pieces is at one end of said ramp and greater than the depth of said C-shaped member when each of said wedge pieces is at another end of said ramp.

9. The apparatus of claim 8 wherein each of said legs includes a first side having said ramp formed thereon oblique to the longitudinal axis and a second substantially planar side opposite said first side and parallel to said longitudinal axis, each of said wedge pieces having corresponding first and second opposite sides upon which a corresponding ramp and planar surface is formed.

10. A picture frame corner for display comprising:

first and second frame members, each frame member having a a tubular member with a longitudinal channel formed therein, the longitudinal channel having a predetermined height and being adapted to receive a joining means, the tubular member further including a longitudinal opening to provide access to the joining means when the joining means is received in the longitudinal channel, at least one end of the frame members being mitred to dispose the frame members at a predetermined angle when the mitred ends of the frame members are placed in abutting relation; and joining means for joining the first and second frame members in abutting relation at the predetermined angle, the joining means including:

first and second legs, each leg being received in a corresponding frame member longitudinal channel;

means for disposing the first and second legs at the predetermined angle relative to each other;

the first and second legs including:

a bottom adapted to contact one of the frame members;

a top;

first and second sidewalls connected to opposing lateral sides of the bottom and the top and substantially corresponding in height to the predetermined height of the longitudinal channel;

a leg surface having first and second elongate slots of a nonuniform depth defined on the corresponding first and second legs; and first and second wedge pieces, having tabular projections along a bottom surface, said wedge pieces being slidably received linearly along a portion of the length of the slots and defining a corresponding raised planar surface of variable distance above the leg surface, said distance responsive to the placement of the wedge pieces within a particular portion of the nonuniformly deep slots.

11. The picture frame corner of claim 10, further including a raised fillet surface defined on the bottom of the first second legs and sized to substantially fill the longitudinal opening of the frame channel along the inserted length of the leg when the leg is inserted face-down within the channel.

12. The picture frame corner of claim 11, further including attachment means located on the raised fillet surface for mounting the picture frame corner to a wall.

13. The picture frame corner of claim 12, wherein the attachment means includes a hook or loop material adhered to a portion of the fillet surface for attachment to a complementary material adapted to be located on a wall location.

* * * * *